Jan. 8, 1957  J. C. R. KELLY, JR., ET AL  2,776,886
PROCESS OF PREPARING AND TREATING REFRACTORY METALS
Filed Aug. 28, 1952
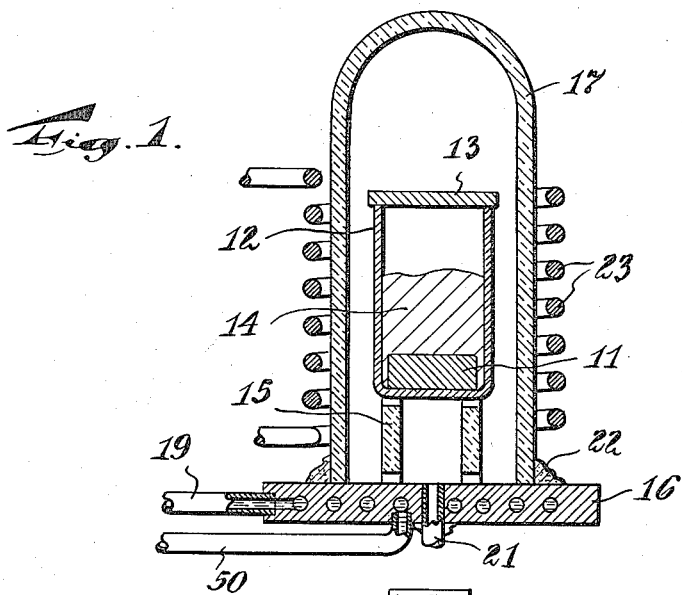
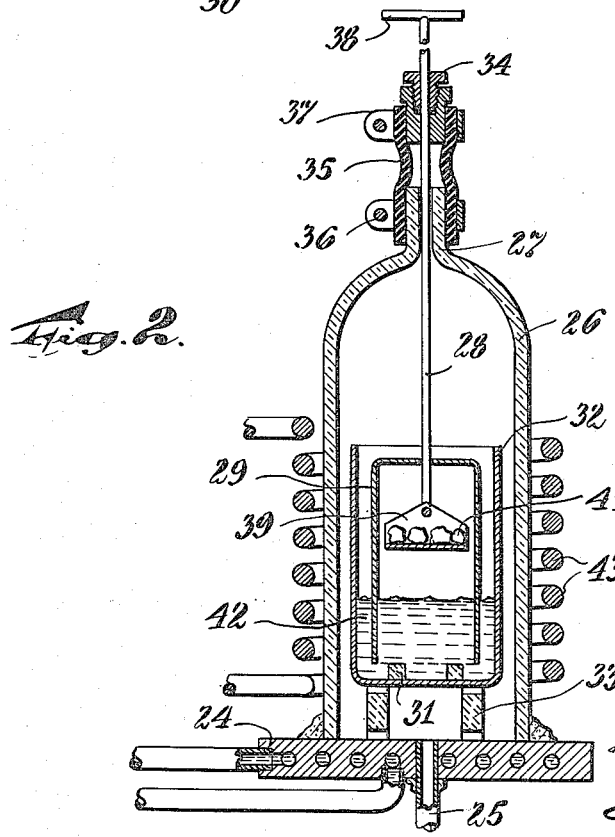
INVENTORS
J. C. R. KELLY, Jr.
and EDWARD GREGORY.
BY
ATTORNEY United States Patent Office 2,776,886
Patented Jan. 8, 1957

2,776,886

PROCESS OF PREPARING AND TREATING REFRACTORY METALS

John C. R. Kelly, Jr., Upper Montclair, N. J., and Edward Gregory, Pittsburgh, Pa., assignors to Westinghouse Electric Corporation, East Pittsburgh, Pa., a corporation of Pennsylvania Application August 28, 1952, Serial No. 306,812

3 Claims. (Cl. 75—211)

This invention relates to the removal of embrittling materials from massive specimens of the rarer refractory metals and their alloys.

The principal object of our invention, generally considered, is to remove harmful gaseous impurities from titanium, vanadium, tantalum, chromium, molybdenum, and tungsten by means of cerium.

Another object of our invention is the improvement in the physical characteristics of the rare refractory metals of groups IV, V and VI, such as titanium, vanadium, tantalum, chromium, molybdenum and tungsten, by immersing ingots thereof pressed or sintered in molten or gaseous cerium to remove, or partially remove, harmful gases such as oxygen and nitrogen therefrom while, if not already sintered, sintering or partially sintering the same.

Other objects and advantages of the invention will become apparent as the description proceeds.

Referring to the drawing, in which like numerals designate similar parts:

Figure 1 is a vertical sectional view of apparatus for treating ingots of refractory metal produced by powder metallurgy, in order to soften them by removing undesirable gaseous impurities therefrom.

Figure 2 is a vertical sectional view of apparatus for treating ingots of refractory metal in cerium vapor.

One of the factors which contributes to the classification of said metals as rare or less common, is the marked affinity displayed by such metals for the common atmospheric elements, nitrogen and oxygen. These elements if absorbed severely embrittle such metals and render them useless for fabrication and engineering purposes, as well as adversely affecting their corrosion resistance.

To decrease the oxygen and nitrogen content of these metals, thermodynamic reasoning has indicated that the oxides of titanium, vanadium, tantalum, chromium, molybdenum and tungsten should be reduced by cerium metal, which is commonly obtained as misch metal comprising approximately 90% of cerium, while all but titanium should have their nitrides reduced by cerium metal.

In addition, cerium metal with substantially zero nitrogen content should be capable of reaching an equivalence of nitrogen content with titanium at some value which would represent a reduction of about 50% of the initial nitrogen content.

In the joint application of W. C. Lilliendahl and the present joint applicant E. Gregory, Ser. No. 204,386, filed January 4, 1951, now Patent No. 2,707,679, and entitled "Methods of Producing Zirconium and Titanium," there is disclosed a method of manufacturing such metals by reducing the oxides thereof by means of magnesium and calcium, or alloys of such metals, and subsequently purifying such metals in massive pressed or sintered form by treatment in molten calcium or the vapor of that metal. Molten calcium has been found to be satisfactory for removing oxygen from such metals and, in addition, from a number of other metals including vanadium and hafnium. It is, however, not suitable for removing nitrogen from such metals, as that gaseous impurity is on the contrary picked up by such metals, if present in calcium, when the same are heated in contact therewith.

Also, the vapor pressure of calcium is 1 mm. of Hg at 817° C., Dushman, "Vacuum Technique," John Wiley & Co., 1949, necessitating the use of argon at a comparatively low temperature and causing, in spite of the argon, considerable vaporization of calcium at the effective soaking temperature of approximately 1000° C.

In the case of cerium the same vapor pressure, 1 mm. of Hg, is only reached at 1599° C., permitting operation in vacuum or argon without the troublesome vaporization at any point in the temperature range hereinafter specified.

It is, therefore, the main purpose of the present invention to employ cerium to remove nitrogen, as well as oxygen, from metals of the defined general class.

The practice of the present invention involves the immersion of either pressed or sintered objects of the above named metals in a quantity of molten cerium held at such a temperature and for such a time that interstitial embrittling impurities, such as oxygen and/or nitrogen, diffuse to the surface of the metal and react with the cerium. The general equations for such reactions are these:

For oxygen:

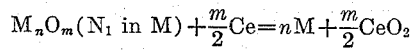

(a specific example being: $2V_2O_3 + 3Ce = 4V + 3CeO_2$).

For nitrogen:

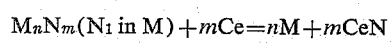

(a specific example being: $VN + Ce = V + CeN$), where

M represents any metal named
O represents oxygen
N represents nitrogen
$M_n$ represents stoichiometric constants
$N_1$ represents concentration of oxide or nitride in mass of metal.

The physical properties, particularly hardness and loss of ductility, of coherent metal produced from compacts made from powdered metal of the group specified, are directly related to their oxygen and nitrogen content. As an illustration, a metal such as zirconium, which although not included in the group, serves to illustrate a similar effect, when made by the iodide process is very soft, ductile, and contains only about .001% to .003% nitrogen, and .01 to .03% oxygen by weight. With increasing content of oxygen, nitrogen, or both, the hardness of such metal increases and the ductility falls off rapidly until, with .2% or more oxygen, the metal becomes very difficult to fabricate and is hard and brittle, even when annealed. Heretofore, no satisfactory method has been discovered for removing or materially reducing the nitrogen content of metals of the group under consideration although, as before explained, calcium has been used to reduce the oxygen content of some of such metals.

It is known that oxygen is in a somewhat mobile condition in these metals as it has been demonstrated on very fine wires that it is possible to cause migration of the oxygen contained in a wire, when a unidirectional potential is applied to said wire. Wires treated in this manner at elevated temperature show a hardness gradient from one end to the other as the electrolysis proceeds.

The application previously referred to shows that the oxygen content and resulting hardness of such metals may be substantially reduced by treating the metal in a massive state, either merely pressed or pressed and sintered, in calcium vapor at elevated temperatures or in molten calcium. It has been found that three hours at 1000 C. to 1300° C., in an argon atmosphere saturated with calcium vapor, or the same length of time in molten calcium, appreciably reduces the hardness of zirconium which was embrittled by oxygen.

Following the analytical proof of oxygen removal from zirconium, the process was further studied to determine the effect of time and temperature on the rate of oxygen removal. However, as before mentioned, such treatment is ineffective for removing nitrogen and we have for that purpose turned to cerium.

Figure 1 illustrates one form of apparatus for treating metal, of the character specified, in molten cerium. Here the reference character 11 designates a pressed ingot, or one which has also been sintered, from one of the enumerated metals in powdered form. This is placed in a container 12 desirably formed of molybdenum, or iron lined with tantalum, and covered by a plate 13 of the same or suitable metal, after placing in said container, a quantity of metallic cerium 14. The cerium is desirably as pure as can be obtained, although a high cerium content alloy, such as misch metal, is suitable for the purpose. This container 12 is supported on a hollow refractory insulator 15, which in turn rests on a metal plate or base 16, and the container and insulator are placed under a bell jar 17, desirably formed of high silica glass.

The metal plate 16 is preferably cooled by circulating water therethrough from inlet pipe 50 to outlet pipe 19. It is tubulated, as indicated at 21, and connected to an exhaust system which may conveniently comprise a high vacuum pump, or mercury diffusion pump, and a liquid air trap, such as represented by the character 17 in the Rentschler et al. Patent No. 2,446,062, dated July 27, 1948. The bell jar 17 is desirably just large enough to slip over the cup 12. It is set on the metal base 16 and sealed vacuum-tight thereto, preferably by means of vacuum wax 22. The jar is then exhausted to a high vacuum, about 50 microns, through a valve or stop cock, (Figure 1, Patent No. 2,446,062), a Geissler tube serving to indicate the degree of exhaust obtained, all as illustrated in said patent.

Argon gas (99.7%) is then introduced, as from a tank, to a pressure of about ¾ of an atmosphere. A mercury column (not shown) may indicate this pressure. A glass trap or blow off, comprising a mercury column, may also be provided as disclosed in said patent. The metal cup 12 is then slowly heated to melt the cerium 14 as, for example, by a high-frequency oscillator connected to a surrounding coil 23, to between 1000° and 1300° C., and held at that temperature for two or three hours. Specific examples are soaking for about 5 hours at about 1000° C. or for about 1 hour at about 1300° C. The cup is then cooled, and the ingot or pieces 11 of rare metal separated from the cerium matrix by leaching with dilute hydrochloric or acetic acid, as in accordance with the removal of the zirconium powder from its reducing metal and associated material described in said application, Ser. No. 204,386, previously referred to.

Referring now to the embodiment illustrated in Figure 2, there is shown a metal plate 24, tubulated as indicated at 25, and connected to a high-vacuum exhaust system by means of said tubulation. A preferably 96% silica bell jar 26 is employed, as in Figure 1, except that in this instance the top of said jar has an extension 27 apertured to allow for sliding a rod 28 therethrough. The lower end of said rod 28 passes through an aperture in an inverted hollow cylindrical member 29, desirably formed of refractory metal like the container 12 of Fig. 1, the lower edge of which rests on a hollow refractory insulator 31 which is, in turn, supported on the bottom of the cup or crucible 32. The crucible 32, also desirably formed of refractory metal like container 12, rests on a refractory insulator support 33, which is, in turn, supported on the metal plate 24. Means for cooling said plate are desirably provided as in the form of Figure 1. The lower edge of the bell jar 26 may be sealed to the plate 24 as in the first embodiment.

Provision is made for allowing the rod 28 to be raised or lowered, such as by a gland 34 in which said rod slides air-tight. Said gland is desirably resiliently mounted with respect to the extension 27, as a means of a rubber or resilient tube 35, the lower end of which is connected to the extension as by means of clamp 36, and the upper end of which is connected to the gland 34 by means of clamp 37. The rod 28 is desirably provided with an operating handle 38.

The lower end of the rod 28 supports a tray, holder, or cage 39, which may serve for supporting objects formed of merely pressed, or pressed and sintered, metal of the class under consideration, such objects being here designated 41, while the same are being purified, as by treatment in the vapor of cerium from the molten mass 42 thereof. Such metal may be heated in the crucible 32 as by means of high-frequency coil 43. Said rod 28 may be pushed down to lower the holder 39 into the molten cerium, for treatment of the rare metal therein and, after sufficient treatment, the same may be raised to bring the rare metal to a position above the surface of the molten cerium for vapor treatment.

From the available data on the thermodynamic properties of cerium nitride and oxide, we may deduce that the following negative free energies represent the tendency of the metal cerium to remove nitrogen and oxygen from the rare metals tabulated below.

*Free energy of reaction-cerium metal+metal oxide or nitride*

| Metal | Oxide, kcal./mole $O_2$ | Nitride, kcal./mole $N_2$ |
|---|---|---|
| Ti | −32 | +5 |
| V | −38 | −60 |
| Ta | −42 | −36 |
| Cr | −64 | −92 |
| Mo | −110 | −120 |
| W | −112 | −118 |

As an example of what has been accomplished by the practice of our invention, the following table shows the results obtained by using it in the purification of vanadium:

*Hardness of vanadium metal before and after cerium soaking*

| Condition (Sample "A," 950° C., Sample "B," 1,150° C.) | Vickers Pyramid Numbers | Percent Improvement | |
|---|---|---|---|
| | | Over as received | Progressive |
| As received | 242 | | |
| As annealed | 221 | 8.7 | 8.7 |
| As soaked at 950° C | 200 | 17.5 | 9.5 |
| As soaked at 1,150° C | 186 | 23.7 | 15.9 |
| As degassed in vacuum to removed hydrogen at 950° C | 199 | 17.8 | 0.5 |
| As degassed in vacuum to remove hydrogen at 1,150° C | 176 | 27.4 | 5.4 |

Nitrogen and oxygen are removed in 1150° C. soak. Oxygen is removed in the 950° soak.

As for the preparation of the metal powder from which pressed or pressed and sintered ingots of other articles may be produced for treatment, titanium powder may be reduced from its oxide by magnesium and calcium, or alloys of such metals, as described in the copending application above referred to. More specifically, the improved method for producing titanium, involves using first magnesium or a magnesium-rich alloy and then calcium or a calcium-rich alloy, whereby the more expensive reduction material, calcium, is conserved, while at the same time a purer product is produced because of the greater purity of magnesium as compared with calcium. The aforedesired method is adaptable to large scale production, wherein iron contamination is avoided, even though an iron crucible or container is employed, by lining it with calcium oxide or magnesium oxide. The improved method also includes the compacting of the charge by hydraulic pressure, in effecting the first reduction, while pelleting the material, in effecting the second reduction.

Molybdenum powder may be produced as described in the copending joint application of the present applicant John C. R. Kelly, Jr. and Allen G. Caterson, Ser. No. 305,806, filed August 22, 1952. The other metals, and even those above mentioned, may be produced by conventional or commercial methods known in the art, pressed to the desired form, and treated. They may, as an alternative, be pressed and sintered before such treatment, or pressed and treated at a high enough temperature to simultaneously effect sintering while being treated.

Although preferred embodiments of our invention have been described, it will be understood that modifications within the spirit and scope of the invention may occur to those skilled in the art.

We claim:

1. The method of producing titanium and freeing it from dissolved gas comprising mixing a compound thereof with reducing material comprising mainly magnesium, in excess of that theoretically needed to effect complete reduction, melting the reducing material in inert gas to cause it to react with said compound and effect a partial reduction as nearly complete as possible under the circumstances, cooling the mixture, leaching, drying the partially reduced compound, mixing it with reducing material comprising mainly calcium, in excess of that theoretically needed to effect complete reduction, melting the reducing material in inert gas to cause it to react with the partially reduced compound and liberate the titanium in powdered form, cooling the mixture, leaching, and drying the separated powdered metal, pressing the powdered metal, and finally treating said pressed metal in cerium made fluid by heat to remove dissolved gas therefrom.

2. The method of producing titanium and freeing it from dissolved gas, comprising mixing a compound thereof wtih reducing material comprising mainly magnesium, in excess of that theoretically needed to effect complete reduction, melting the reducing material in inert gas to cause it to react with said compound and effect a partial reduction as nearly complete as possible under the circumstances, cooling the mixture, leaching, drying the partially reduced compound, mixing it with reducing material comprising mainly calcium, in excess of that theoretically needed to effect complete reduction, melting the reducing material in inert gas to cause it to react with the partially reduced compound and liberate the titanium in powdered form, cooling the mixture, leaching, and drying the separated powdered metal, pressing the powdered metal, sintering said pressed metal to coherent form, and finally treating the sintered metal in cerium made fluid by heat to remove dissolved gas therefrom.

3. The method of producing titanium and freeing it from dissolved gas, comprising mixing a compound thereof with reducing material comprising mainly magnesium, in excess of that theoretically needed to effect complete reduction, melting the reducing material in inert gas to cause it to react with said compound and effect a partial reduction as nearly complete as possible under the circumstances, cooling the mixture, leaching, drying the partially reduced compound, mixing it with reducing material comprising mainly calcium, in excess of that theoretically needed to effect complete reduction, melting the reducing material in inert gas to cause it to react with the partially reduced compound and liberate the titanium in powdered form, cooling the mixture, leaching, and drying the separated powdered metal, pressing the powdered metal, and finally treating the sintered metal in cerium made fluid by heat and at a temperture high enough to sinter and remove dissolved gas therefrom.

References Cited in the file of this patent

UNITED STATES PATENTS

| 1,008,806 | Farkas | Nov. 14, 1911 |
|---|---|---|
| 1,211,635 | Smith | Jan. 9, 1917 |
| 1,653,366 | Marden et al. | Dec. 20, 1927 |
| 2,113,356 | McKenna | Apr. 5, 1938 |
| 2,352,246 | Benner | June 27, 1944 |
| 2,546,320 | Rostron | Mar. 27, 1951 |
| 2,653,869 | Gregory et al. | Sept. 29, 1953 |

FOREIGN PATENTS

| 1,814/31 | Australia | Apr. 27, 1931 |